United States Patent [19]

Ellers

[11] Patent Number: 4,923,025
[45] Date of Patent: May 8, 1990

[54] HYBRID ELECTRIC/ICE VEHICLE DRIVE SYSTEM

[76] Inventor: Clarence W. Ellers, 2892 Mesquite Dr., Santa Clara, Calif. 95051

[21] Appl. No.: 108,581

[22] Filed: Oct. 8, 1987

Related U.S. Application Data

[63] Continuation-in-part of Ser. No. 789,404, Oct. 21, 1985, abandoned, which is a continuation-in-part of Ser. No. 283,611, Jul. 15, 1981, abandoned.

[51] Int. Cl.$^5$ ............................................. B60L 11/12
[52] U.S. Cl. .................................. 180/65.2; 180/65.4
[58] Field of Search ...................... 180/65.4, 65.2, 65.1

[56] References Cited

U.S. PATENT DOCUMENTS

| | | | |
|---|---|---|---|
| 2,244,216 | 6/1941 | Pieper | 180/65.2 |
| 3,211,249 | 10/1965 | Papst | 180/65.2 |
| 3,348,623 | 10/1967 | Potter | 180/65.4 |
| 3,352,373 | 11/1967 | Tuck | 180/65.4 |
| 3,874,472 | 4/1975 | Deane | 180/65.2 |
| 4,042,056 | 8/1977 | Horwinski | 180/65.4 |
| 4,180,138 | 12/1979 | Shea | 180/65.4 |
| 4,351,405 | 9/1982 | Fields et al. | 180/65.4 |
| 4,405,029 | 9/1983 | Hunt | 180/65.2 |
| 4,438,342 | 3/1984 | Kenyon | 290/45 |
| 4,533,011 | 8/1985 | Heidemeyer et al. | 180/65.2 |

Primary Examiner—David M. Mitchell
Attorney, Agent, or Firm—Jones, Tullar & Cooper

[57] ABSTRACT

Presented is a hybrid vehicle selectively driven by either an electric motor or an internal combustion engine acting independently of the other, or by both electric motor and internal combustion engine acting in unison. The vehicle is initially propelled by the electric motor working through a four speed transmission to drive a first set of wheels, and speed control is achieved by shifting of the transmission, either manually or automatically, while in electric drive alone. When the vehicle achieves a predetermined cruising speed while being propelled by the electric motor, a speed sensor activates the application of a less than maximum voltage to a magnetically actuated variable torque converter interposed between the second set of wheels, which are rotating on the roadway, and the internal combustion engine. The momentum of the vehicle, acting through the second set of wheels, actuates the variable torque converter to "crank" the internal combustion engine to start it. As soon as the internal combustion engine starts and is running at constant speed, the electric motor is deenergized as a driving Unit. The electric motor may be re-established as a driving unit to assist the internal combustion engine in propelling the vehicle.

8 Claims, 1 Drawing Sheet

HYBRID ELECTRIC/ICE VEHICLE DRIVE SYSTEM

This application is a Continuation-in-Part of prior application, Ser. No. 789,404 filed Oct. 21, 1985 which is a Continuation-in-Part of Ser. No. 283,611 filed Jul. 15, 1981, both now abandoned.

BACKGROUND OF THE INVENTION

1. Field of the Invention.

This invention relates to hybrid electric/internal combustion automobiles, and more particularly to such an automobile in which the electric motor drives one set of wheels through a low speed range and the internal combustion engine drives the other set of wheels at a predetermined and selected higher speed range, with the internal combustion engine being activated automatically when the automobile has attained the selected predetermined speed.

2. Description of the Prior Art.

Prior patents of which I am aware include the following U.S. Pat. Nos.:

2,244,216; 3,057,427; 3,211,249; 3,348,623; 3,352,373; 3,503,464; 3,809,978; 3,861,484; 3,874,472; 3,888,325; 3,923,115; 4,042,056; 4,180,138; 4,351,405; 4,405,029; 4,438,342; 4,533,011.

It is apparent from an examination of these patents, for instance, U.S. Pat. No. 2,244,216, that the concept of a hybrid electric/internal combustion engine has existed for at least half a century. The concept of driving two pairs of wheels, either selectively in a two-wheel drive configuration, or simultaneously in a four-wheel drive configuration, has also existed for at least the same interval. As demonstrated by the patents listed, many different patentably inventive structural and electrical arrangements have been devised through the years to implement these concepts.

SUMMARY OF THE INVENTION

Hybrid automobiles have been proposed in the past wherein an electric motor is combined with an internal combustion engine. Such drive systems as have been used in the past have been inefficient and have resulted in undue amount of pollution.

The primary reason for this is that the internal combustion engine has been used at low and variable speeds and particularly in stop and go traffic, where fuel consumption and pollution are at maximum.

In accordance with the present invention a hybrid automobile is provided wherein one set of wheels is provided with an electric drive with a mechanical gear shift, and wherein an internal combustion engine is directly coupled to the other set of wheels and does not come into play until the vehicle has reached a desirable highway cruising speed, such as 55 mph. Normally, after the car has reached cruising speed the electric motor would be automatically cut out but if a high rate of acceleration is required under some circumstances, both electric and internal combustion drives can be employed simultaneously.

Thus the present invention provides a vehicle having two sets of wheels with one set of wheels driven by a mechanical transmission from an electric motor and with the other set driven by a direct connection through a continuously variable torque converter from an internal combustion engine. In this manner maximum efficiency and minimum pollution are produced.

The phrase "Fail Safe System" as used herein comprises an auxiliary generator driven directly by the internal combustion engine, and is started manually when the vehicle is standing or automatically when the vehicle is moving. Full time regeneration is provided by the electric drive motor used as a generator any time the vehicle wheels are rotating, as when coasting or when powered by the ICE.

Various other objects and features of the invention will be brought out in the balance of the specification.

DESCRIPTION OF THE PREFERRED EMBODIMENT

Figure 1:
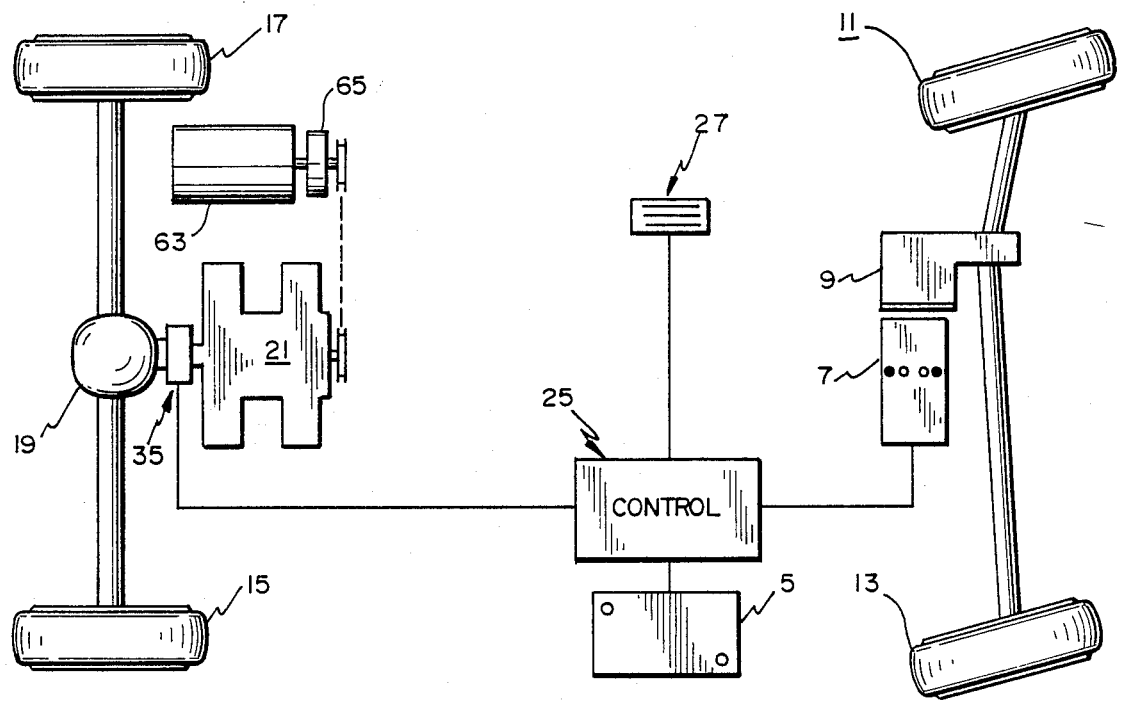
FIG. 1 is a plan view of the operating parts of a vehicle embodying the present invention.

Referring now to the drawings by reference characters, the vehicle of the present invention has a traction battery 5 which is coupled to an electric motor 7 which is provided with a mechanical transmission 9 to drive the front wheels 11 and 13 of the vehicle. In a practical embodiment of the invention, the electric motor 7 was 20 horsepower, and the transmission 9 consisted of a four-speed transaxle controlled by the controller 25 (PMC 400 Amp pulse width modulator). The rear wheels 15 and 17 are connected through a differential 19 to a small internal combustion engine 21 by a continuously variable electric torque converter 35 which may conveniently be of the type known as a French-Jaeger Coupleur, and also controlled by the controller 25 (PMC 400 Amp pulse width modulator) through actuation of accelerator 27. Accelerator 27 when released actuates the full time regeneration system 70 (FIG. 2) by interlock 71 with drive relay 59. Batteries 5 are paralleled to half voltage in regeneration mode for higher currents at slower speeds. It should be particularly noted that no gear shift or throttle control is provided for the internal combustion engine. While this feature makes absolute use at maximum efficiency of the ICE, it makes it impossible to accelerate to cruising speed with the ICE, making a fail safe DC supply necessary. In the present embodiment a 200 amp auxiliary DC generator 63 is driven directly by the ICE through electric clutch 65. Clutch 65 is closed when the ignition key is ON only when battery voltage is below 5.25 volts per 6 volt battery as sensed by the A/D converter onboard the processor 69. The fail safe system has three modes for starting the ICE. When batteries are low:

1. Standing start key starter switch, warning light, and audible alarm are armed from fail safe clutch 65, start engine in normal manner.

2. Running on electric, torque converter 35 is momentarily energized by processor control 25, automatically starting ICE by rotation from rear wheels through torque converter.

3. Running on ICE, fail safe system is automatic because ICE is running.

Figure 2:
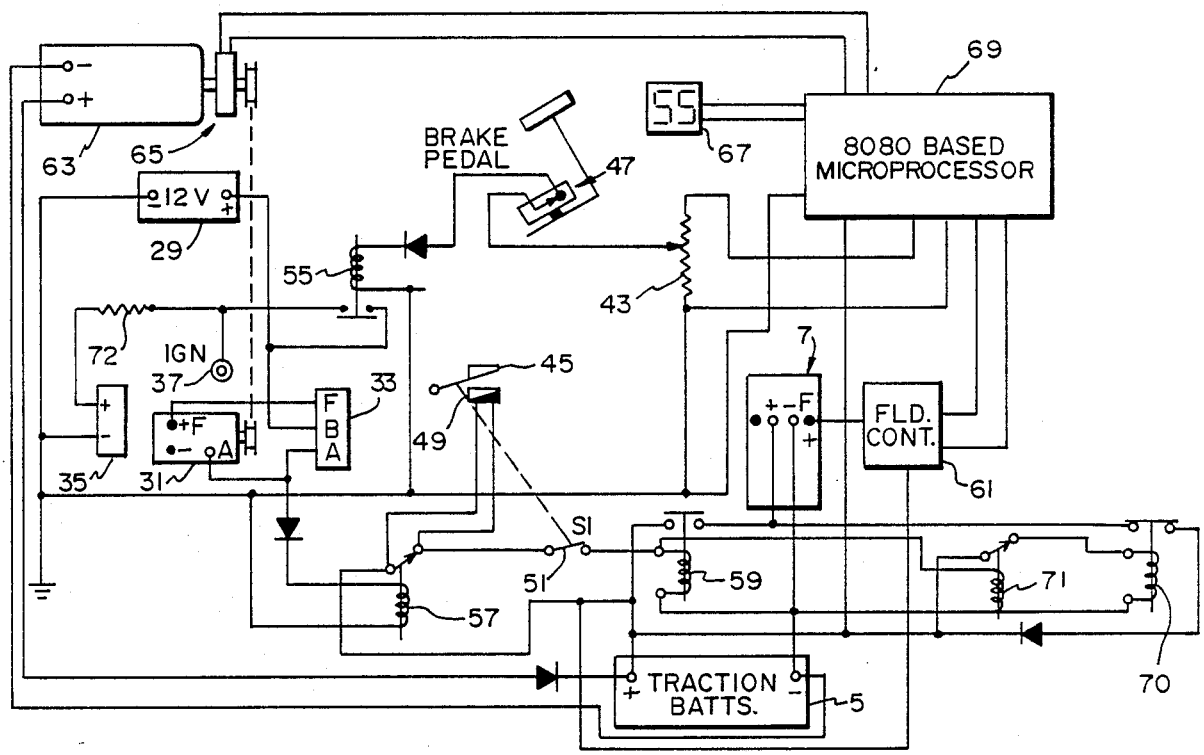
FIG. 2 is a schematic diagram of one possible control circuit.

Although my invention is not limited to a particular control circuit, a practical circuit is shown in FIG. 2 and is illustrative of the various circuits that can be used. The internal combustion engine is provided with a conventional 12 volt battery 29 which is connected to the 12 volt generator or alternator 31 through a voltage regulator 33 both of which are integral parts of the ICE. The continuously variable torque converter 35 is controlled by relay 55 which, when closed by processor 69 when the vehicle has reached a selected cruising speed, applies a reduced voltage, approximately 8 volts, to the torque converter. In a prototype embodiment of the invention, the voltage drop was obtained by locating the 12 volt battery in the front of the vehicle and locating the torque converter in the extreme rear of the vehicle. If the 12 volt battery should be mounted close to the torque converter, a resistor rated at approximately one-half ohm and 30 watts would be required in the lead supplying electric power to the torque converter. This is imperative to avoid over speeding the engine. Relay 55 is a double pole type to allow isolation of the ignition from the torque converter for stationary testing of the ICE and operation of the fail safe system without coupling the ICE to the wheels.

MICROPROCESSOR CONTROL

The digital output signal that activates the digital speedometer display 67 is fed directly into the processor 69 and functions as a speed sensor for automatic changeover from the electric motor drive to the ICE drive. The voltage of drive battery 5 is monitored through the A/D converter (on board 69) and is connected to one input of the processor 69. The processor 69 output then controls the field controller 61 so that the drive batteries 5 are charged by the regeneration circuit of the drive motor 7, in proportion to their state of charge.

If the charge of drive batteries 5 should get too low (5.25 volts per 6 volt battery), the processor 69 is programmed to close the fail safe system clutch 65 so that the ICE 21 will directly drive the fail safe 200 amp generator 63 so that the vehicle can be driven as a series hybrid. The accelerator pedal 45 is connected to two single pole-single throw switches designated 49 and 51. The sequence of operation is such that as accelerator pedal 45 is first depressed a small amount, switch 51 will be closed but switch 49 will not close until accelerator pedal 45 is pushed all the way down. Relay 55 has its contacts in the circuit of the continuously variable magnetic torque converter 35 and the ignition coil 37 so that as this relay is actuated by processor 69, the torque converter will be energized at approximately 8 volts and the ignition will be turned ON. The speed at which this happens is selected by adjusting the position of the wiper arm on potentiometer 43.

Relay 57 is actuated by the armature circuit of the voltage regulator 33 (integral part of the ICE). As voltage builds up in this circuit to approximately 14 volts, torque converter 35 locks up and relay 57 will drop out, opening the circuit to drive relay 59 and automatically shutting down the electric drive motor 7. Relay 59 is actuated by the switch 51 through the contacts of relay 57 and serves to turn the drive motor 7 ON or OFF. The field control 61 (20 amp PWM) serves to regulate the charging rate of the drive batteries when the electric drive motor 7 is acting as a generator as is later explained.

In operation, the parts are initially in the positions shown in FIG. 2. Now as the operator depresses accelerator pedal 45 the switch 51 will close. The closing of switch 51 will actuate the drive relay 59, thus connecting the electric motor 7 to the drive battery 5. Now the operator will shift through the gears in the normal manner utilizing the transmission 9. Assuming all the driving was at low urban speeds, only the electric drive motor would be used. However, as the vehicle approaches a pre-selected desirable highway speed, such as 55 mph, the BCD output of the digital speedometer 67 will cause the processor 69 to close relay 55 through normally closed switch 47, and applies approximately 8 volts to the continuously variable torque converter 35 which provides enough torque to "crank" and thus initiate starting of engine 21 at the preset constant speed. This reduced voltage also allows proper slippage in the torque converter to assure smooth and exact automatic synchronization between the electric motor and ICE drive systems. With the ICE 21 running, the relay 57 will receive enough voltage from the 12 volt generator 31 through the armature circuit of the regulator 33 to actuate relay 57 (31 and 33 are integral parts of the ICE). T actuation of relay 57 will open the circuit to drive relay 59 which then opens, removing voltage from electric motor 7, (assuming that switch 49 is not yet closed). Now if the operator pushes down hard on the accelerator pedal 45, switch 49 will close, completing the circuit between the contacts on relay 57 and closed switches 49 and 51, thus actuating relay 59, so that now both the electric motor and the internal combustion engine are in operation. Thus, switch 49 acts as an override to energize the electric motor and thus drive the front wheels while the ICE is running and driving the rear wheels to permit simultaneous operation of both electric and ICE drives when this is desired, as in passing and/or climbing. Switch 47 is set so that a small motion of the brake pedal drops out relay 55, removing voltage from ignition 37 and torque converter 35, thus automatically interrupting operation of the ICE and returning the vehicle to solely electric drive.

Full time regeneration for compression braking and charging the drive batteries is supplied in the following manner. A small normally closed pilot relay 71 is provided, with its coil connected directly to the coil of drive relay 59. The pilot relay controls a power relay 70 having its contacts connecting a 400 amp diode from the positive terminal of the drive motor 7 directly to the positive terminal of the drive battery 5. The system is thus supplied with full time regeneration anytime the drive relay 59 is open, the regeneration relay 70 is closed, and vice versa. In the present embodiment the pilot relay 71 also controls the series-parallel circuit so that the batteries are always switched to half voltage for better regeneration at low speeds. Regeneration current is controlled by the field controller 61 and the processor 69 as explained above.

This is a complete automatic control based on the 8080 microprocessor. Other methods may be used and still maintain the completely automatic feature, such as a simple electro-mechanical system. Such a circuit is disclosed in my now abandoned application Ser. No. 283,611.

Many variations can be made in the specific structure shown and described herein without departing from the spirit of this invention. For instance, the electric motor has been shown attached to the front wheels with the internal combustion engine attached to the rear wheels but this could easily be reversed. Also, instead of employing a mechanical clutch on the electric motor, an electric clutch could be applied here as well. Of course, the processor could open the clutch for cruising and close the clutch for charging, depending on the state of charge as sensed from the traction batteries.

It has been found that if the vehicle of the present invention is driven approximately 30% of its mileage over 55 mph (on ICE) the batteries would never need charging from an outside source.

I claim:

1. A hybrid vehicle, comprising:
   (a) a first set of wheels;
   (b) a multi-speed transmission;
   (c) electric motor means for driving said first set of wheels through said transmission;
   (d) an internal combusion engine having a 12 volt alternator and an ignition circuit;
   (e) a second set of wheels;
   (f) a continuously variable magnetic torque converter means operatively interposed between said internal combustion engine and said second set of wheels for directly driving said second set of wheels by said internal combustion engine;
   (g) control circuit means connected to said electric motor means and to said torque converter, said control circuit means including speed sensor means for energizing said torque converter means at reduced voltage when a preset speed is reached to activate said internal combustion engine, said torque converter locking up only when said 12 volt alternator builds its output voltage to its normal 14 volts value;
   (h) means in said control circuit means responsive to the normal value of said output voltage of said alternator to deactivate said electric motor means;
   (i) an accelerator pedal connected to said control circuit means;
   (j) override means including a microswitch responsive to said accelerator operable when said vehicle is traveling at said preset speed and being driven by said internal combustion engine to reactivate said electric motor, whereby said electric motor and said internal combustion engine both drive said vehicle;
   (k) a brake pedal for braking said vehicle; and
   (l) a brake micro-switch connected to said control circuit and operated by pressure to said brake pedal to switch the vehicle back to electric drive, operation of said brake micro-switch automatically shutting down said internal combustion engine by opening said engine ignition and said torque converter circuits.

2. A hybrid vehicle, comprising:
   (a) a first set of wheels;
   (b) a second set of wheels
   (c) electric motor means including at least one electric storage battery and a multi-speed transmission for selectively driving said first set of wheels;
   (d) internal combustion engine means including a second electric storage battery and a magnetically actuated variable torque converter operatively interposed between said internal combustion engine and said second set of wheels;
   (e) control means including a speed sensor for sensing the speed at which said vehicle is propelled by said electric motor means and operative at a predetermined selected speed to energize said magnetically actuated variable torque converter from said second electric storage battery to less than maximum torque to provide sufficient torque to said internal combustion engine from said second set of wheels to "crank" said engine to effect starting thereof;
   (f) electric power generator means mechanically coupled to said internal combustion engine and electrically connected to said magnetically actuated variable torque converter and operative when said internal combustion engine is running to energize said magnetically actuated variable torque converter to establish a maximum torque connection between said internal combustion engine and said second set of wheels, whereby said second set of wheels is driven directly by said internal combustion;
   (g) electric circuit means operative when said internal combustion engine is activated to automatically inactivate said electric motor means and to thereby cease the driving of said first set of wheels by said electric motor means, whereby said vehicle is propelled solely by said internal combustion engine; and
   (h) accelerator pedal means connected to said electric circuit means, said electric circuit means including switch means responsive to depression of said accelerator pedal to a predetermined position to reenergize said electric motor means to reimpose a driving torque on said first set of wheels simultaneously with the imposition of a driving torque on said second set of wheels by said internal combustion engine.

3. The combination according to claim 2, in which said vehicle is provided with a brake pedal having a predetermined amount of free travel operable when depressed past said free travel to impose a retarding force on said vehicle, and circuit means activated when said brake pedal is depressed within its free travel range to re-energize said electric motor means to drive said first set of wheels, and operative to inactivate said internal combustion engine and said variable torque converter, whereby said vehicle is propelled solely by said electric motor means.

4. A hybrid vehicle, comprising:
   (a) a first set of wheels;
   (b) a second set of wheels;
   (c) a four speed transmission operatively connected to said first set of wheels;
   (d) electric motor means including a battery for selectively driving said first set of wheels through said four speed transmission;
   (e) a continuously variable magnetic torque converter operatively connected to said second set of wheels and adapted to be actuated by the application of varying voltage levels between minimum and maximum levels from different sources whereby the application of a voltage level less than maximum from one such source results in slippage in said torque converter while application of a maximum level of voltage from the other source thereof resulting in locking said torque converter against slippage;
   (f) an internal combustion engine connected to be "cranked" by said torque converter when less than maximum voltage is applied to said variable magnetic torque converter from said one such source when said vehicle is in motion powered by said electric motor means, and connected to drive said second set of wheels through said torque converter when maximum voltage is applied to said variable magnetic torque converter from said other source thereof;
   (g) speed sensor means operatively associated with said variable magnetic torque converter and operable to initiate application of less than maximum voltage to said variable magnetic torque converter from one such source when a predetermined speed has been achieved by the use of only said electric motor means to propel the vehicle, whereby said variable magnetic torque converter is driven by said second set of wheels to "crank" said internal combustion engine to start the same;

(h) electric power generator means comprising said other source of voltage and operatively connected to be driven by said internal combustion engine when it starts as a result of said "cranking" thereof, said electric power generator gradually imposing said maximum level of voltage on said variable magnetic torque converter whereby said internal combustion engine is locked to said variable magnetic torque converter to effect driving of said second set of wheels by said internal combustion engine; and (i) circuit means responsive to said maximum level of voltage to deactivate said electric motor means, whereby said vehicle is driven solely by said internal combustion engine, said electrical circuit means including an override switch selectively actuable by an accelerator pedal which, when actuated when said vehicle is propelled solely by said internal combustion engine, effects energization of said electric motor means whereby said vehicle becomes powered by both internal combustion engine and electric motor means.

5. The combination according to claim 4, in which said one such source of less than maximum voltage is said battery, and the less than maximum level of voltage applied to said variable torque converter is about eight volts.

6. The combination according to claim 4, in which the voltage applied to said variable magnetic torque converter varies from about eight volts to about fourteen volts, and the source of said fourteen volt level of voltage is said electric power generator means driven by said internal combustion engine.

7. The combination according to claim 4, in which control means including a selectively programmable microprocessor is provided, an A/D converter operatively associated with said microprocessor for sensing the voltage level of said battery, second electric power generator means, magnetic clutch means for connecting said second electric power generator means to said internal combustion engine and activated automatically when the sensed voltage level of said battery drops below a predetermined level, whereby said electric power generator is driven directly by said internal combustion engine to recharge said battery and to thereby power said electric motor means when said battery is in a discharged condition.

8. The combination according to claim 7, in which said electric motor means includes a field winding, a field winding controller operatively associated with the field winding of said electric motor means, means including said A/D converter and said microprocessor operative to adjust the voltage of the field winding to convert the electric motor into an electric generator in a regeneration mode wherein the voltage on said field winding controls the charging current to said battery.

* * * * *